W. H. KIDDER.
SHEET COLLATING DEVICE, &c.
APPLICATION FILED AUG. 7, 1915.
1,251,241.
Patented Dec. 25, 1917.
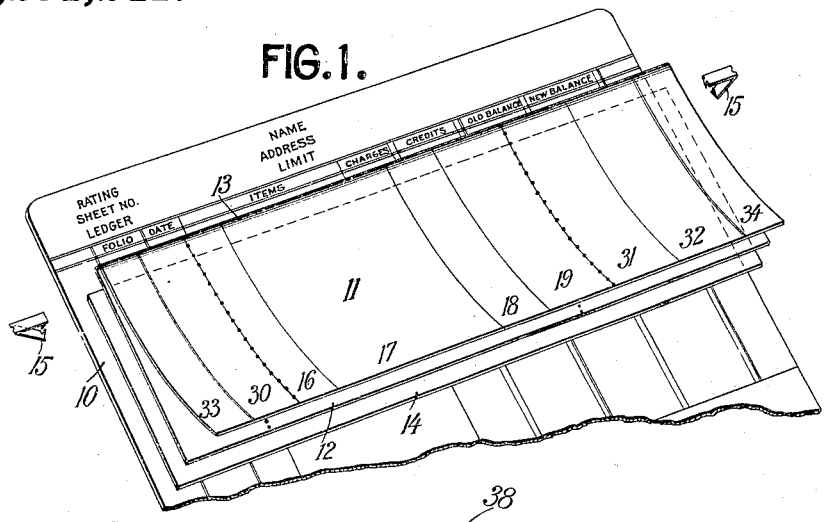
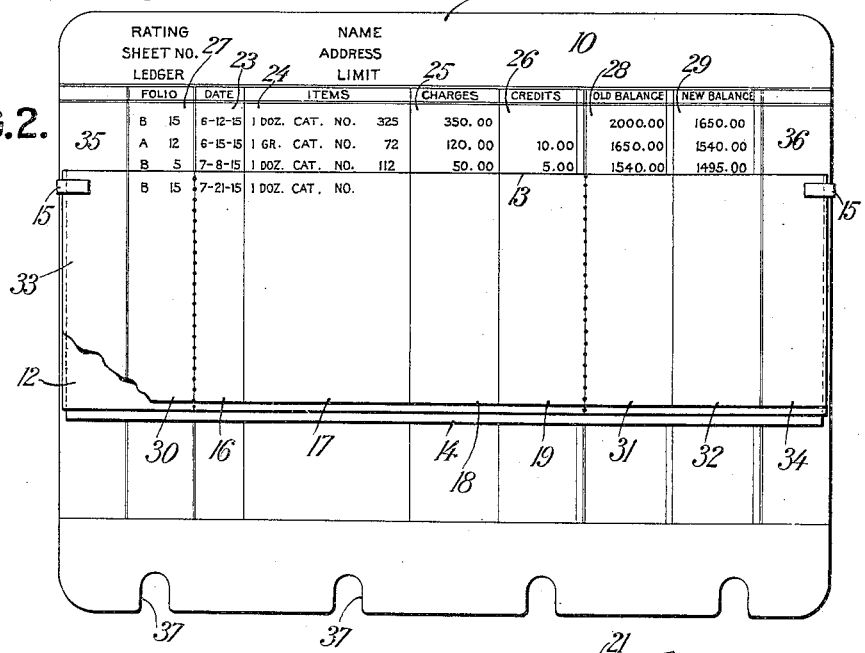
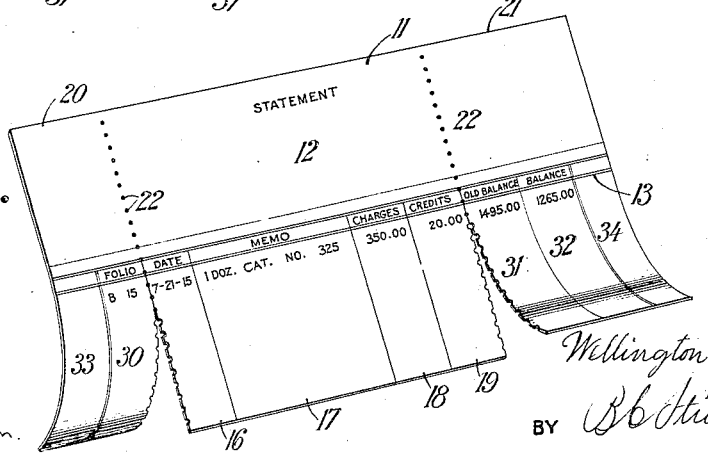
WITNESSES:
Leopold Bittiger
Arthur A. Johnson
INVENTOR:
Wellington H. Kidder
BY B.C. Stickney
ATTORNEY.

UNITED STATES PATENT OFFICE.

WELLINGTON H. KIDDER, OF ROOSEVELT, NEW YORK, ASSIGNOR, BY MESNE ASSIGNMENTS, TO UNDERWOOD COMPUTING MACHINE COMPANY, OF NEW YORK, N. Y., A CORPORATION OF NEW YORK.

SHEET-COLLATING DEVICE, &c.

1,251,241.   Specification of Letters Patent.   Patented Dec. 25, 1917.

Application filed August 7, 1915. Serial No. 44,343.

*To all whom it may concern:*

Be it known that I, WELLINGTON H. KIDDER, a citizen of the United States, residing in Roosevelt, Long Island, in the county of Nassau and State of New York, have invented certain new and useful Improvements in Sheet-Collating Devices, &c., of which the following is a specification.

This invention relates to means for conveniently collating bills and record sheets, for typewriting entries thereon in such a manner as to leave upon the bill only the figures and items that are desired thereon, while conveniently entering on the record sheet a corresponding number of items, together with certain entries which do not appear on the bill, and to provide means for conveniently grouping the records of several bills one under another upon the same record sheet.

For this purpose, the middle or main portion of the record sheet may be ruled with headed columns to contain the same items that are to appear upon the bill or item sheet.

The record sheet may also be provided with columns for special entries which are not required to be placed upon the bill; and in order to permit the bill to be collated upon the record sheet, the former is widened sufficiently to overlie said special record columns and to equal the width of the record sheet. The bill is also ruled in the same way as the record sheet so that said special record entries may be properly written upon the bill; but this portion of the bill containing said special entries is intended to be torn off before the bill is sent to the customer.

Outside of these special entry columns are provided margins on the record sheet, to enable the same to be clipped to the bill; the bill being widened sufficiently to have similar margins. The bill and record sheet are clipped together by clips placed on said margins; and a carbon sheet is placed between the bill and record sheet.

In order to enable the items on successive bills to be entered closely together upon the record sheet, each bill is folded transversely at the top of the item columns thereon, that is, just below the bill-head; so that when a bill is collated upon the record sheet, the top or folded edge of the bill coincides with the top of the columns upon the record sheet, and so that when a second folded bill is placed upon the record sheet, its top or folded edge will lie just beneath or coincidently with the last item that was entered upon the record.

Other features and advantages will hereinafter appear.

In the accompanying drawings,

Figure 1 is a perspective view of a record or ledger sheet, with the folded bill or item sheet and interposed carbon, said parts being separated from one another, and this figure also showing separately the margin clips whereby the sheets may be held together.

Fig. 2 shows the sheets clipped together; the record sheet showing some previously entered items, and the fresh bill being placed lower down upon the record sheet than the previous bill, so that the items written thereon may follow the items previously written upon the record sheet.

Fig. 3 illustrates the method of tearing off the waste margins from the bill or item sheet seen at Fig. 2.

The ledger or record sheet is indicated at 10. The item sheet or bill 11, having a heading 12, is folded transversely, preferably along the line 13, and superposed upon the record sheet 10, with interposed carbon or inking sheet 14; all the sheets being held together by clips 15, which engage opposite side margins of the sheets. The item sheet has columns 16, 17, 18 and 19 for permanent entry of items; these columns forming the main portion of the bill or other item sheet. On the left-hand side there is a marginal portion 20, and on the right-hand side a similar portion 21; these portions being separated by perforated or other weakened lines 22 from the main portion 12 of the bill; said weakened lines extending vertically from top to bottom of the bill, and coinciding with the outer borders of the columns 16 and 19. The record sheet has columns 23, 24, 25 and 26 corresponding with 16, 17, 18, and 19. When the items, therefore, are typewritten upon the bill, the carbon sheet 14 leaves corresponding items imprinted upon the record sheet 10; said sheets being collated with their corresponding columns in register, as seen in Fig. 2.

It is desired on the record sheet to have special permanent record columns 27, 28, 29, which, however, are not desired on the bill; and hence these columns on the ledger sheet are placed beyond the tearing-off lines of the bill, and corresponding columns are provided upon the bill, as seen at 30, 31 32. The entries written in the columns 30, 31 32 on the bill are torn off, and become waste, but their carbon copies appear permanently in the columns 27, 28 and 29 upon the record sheet.

Outside of these columns are the clip margins 33, 34 on the bill sheet, corresponding with the margins 35, 36 on the record sheet.

It will be perceived that for the purpose of enabling a narrow bill to be collated upon a broad ledger sheet, the bill is provided with widened margins, to reach to the side edges of the ledger sheet, for clipping thereto at said edges; the widened margins upon the bill sheet including the columns 30, 31 and 32.

The ledger sheet may have in one edge perforations 37 for temporary binding purposes, these perforations preferably extending along the opposite edge from the top margin 38, which contains the heading of the ledger sheet, thus giving ample room upon the latter for all of the columns and for the side margins 35, 36, without liability of incurring trouble from attempting to fasten clips to the perforated portions 37 of the ledger sheet, as might be the case if the columns were arranged transversely from the arrangement shown. Thus it will be seen that the items of successive bills may be readily placed one under another upon a permanent sheet, and the latter may be conveniently secured by a loose-leaf binder.

Moreover, the collating sheets may, if desired, be left connected together, as shown in Fig. 2, while being withdrawn from the typewriting machine; and may be kept in this condition, if desired, until another item is to be charged upon the same bill, whereupon the sheets, without being separated, may be replaced in the typewriting machine, and a fresh entry made; after which they may be withdrawn and laid away for the entry of future items, to complete the bill. The bill may then be detached from the record sheet, and a fresh folded bill attached thereto, with the columns in register as before, but at a lower position.

Variations may be resorted to within the scope of the invention, and portions of the improvements may be used without others.

Having thus described my invention, I claim:

1. An article of manufacture comprising a packet of bookkeeping sheets, including a record sheet provided with vertical columns having suitable headings, an item sheet having corresponding columns and headings and also provided with a main heading, said item sheet folded under transversely below said main heading, and so placed upon said record sheet with respective columns in register, and clips holding the item and record sheets together at their side edges, with a transfer sheet between the folded item sheet and the record sheet, said record sheet having an additional column for special entries, and said item sheet having a corresponding column, separated by a weakened vertical line from the main portion of the item sheet, said weakened line extending from the top to the bottom of the item sheet, said record sheet and said item sheet having margins to be engaged by clips.

2. An article of manufacture comprising a packet including a record sheet provided with columns having suitable headings, and having an additional column for special entries, an item sheet having corresponding columns, and having a main heading, and also having side margins separated by weakened lines from the permanent portion, whereby said side margins may be torn off as waste; means engaging said side margins to clip the item sheet to the record sheet; said item sheet folded transversely below said main heading to enable an item entered at the top of the columns to appear in duplicate at the top of the record sheet in corresponding columns thereon, said waste margins having columns in which are to be written entries to appear on the record sheet as permanent records, but intended to be torn off from the item sheet, and a transfer sheet between the folded item sheet and the record sheet.

WELLINGTON H. KIDDER.

Witnesses:
 Edith B. Libbey,
 Arthur A. Johnson.